(12) United States Patent
Goldsmith

(10) Patent No.: US 12,110,914 B2
(45) Date of Patent: Oct. 8, 2024

(54) FLUID-CABLE TRANSMISSION FOR REMOTE ACTUATION

(71) Applicant: UTI Limited Partnership, Calgary (CA)

(72) Inventor: Peter Goldsmith, Calgary (CA)

(73) Assignee: UTI Limited Partnership, Calgary (CA)

(*) Notice: Subject to any disclaimer, the term of this patent is extended or adjusted under 35 U.S.C. 154(b) by 0 days.

(21) Appl. No.: 17/287,844

(22) PCT Filed: Oct. 23, 2019

(86) PCT No.: PCT/CA2019/051504
§ 371 (c)(1),
(2) Date: Apr. 22, 2021

(87) PCT Pub. No.: WO2020/082179
PCT Pub. Date: Apr. 30, 2020

(65) Prior Publication Data
US 2021/0381543 A1    Dec. 9, 2021

(51) Int. Cl.
*F15B 7/00* (2006.01)
*F15B 7/02* (2006.01)
(Continued)

(52) U.S. Cl.
CPC .................. *F15B 7/06* (2013.01); *F15B 7/02* (2013.01); *F15B 15/1447* (2013.01);
(Continued)

(58) Field of Classification Search
CPC ...... F15B 7/00; F15B 7/02; F15B 7/08; F15B 15/084; F15B 15/088; F15B 15/1447;
(Continued)

(56) References Cited

U.S. PATENT DOCUMENTS 2,630,180 A * 3/1953 Summers .............. E21B 33/072
254/390
2,733,572 A * 2/1956 Butterfield et al. ... B21D 22/00
92/94
(Continued)

FOREIGN PATENT DOCUMENTS

EP  0236546  * 9/1986 ................ F16C 1/10
GB  1582435 A  1/1981
WO  9614517 A1  5/1996

OTHER PUBLICATIONS

International Patent Application No. PCT/CA2019/051504, International Preliminary Report on Patentability dated Apr. 27, 2021.
(Continued)

*Primary Examiner* — Dustin T Nguyen
(74) *Attorney, Agent, or Firm* — Borden Ladner Gervais LLP; Curtis Behmann

(57) ABSTRACT

A mechanical transmission system that transmits motions and forces from one location to another while allowing the relative position/orientation of the two locations to change continuously is disclosed. The system can be used to actuate the joints and tooling of a robotic arm using stationary motors in the robot's base. Since the motors do not contribute any weight or inertia to the arm, this yields a lightweight and agile arm that is more human safe. The transmission includes a controller hydraulic cylinder connected to a remote cylinder by a tubing assembly, which contains hydraulic fluid, and a wire cable. The fluid transmits pushing forces between pistons of the cylinders, while the cable transmits pulling forces. The tubing assembly allows the cylinders to move in space relative to one another.

18 Claims, 4 Drawing Sheets

(51) Int. Cl.
  *F15B 7/06* (2006.01)
  *F15B 15/14* (2006.01)
  *F15B 15/20* (2006.01)
  *F16C 1/10* (2006.01)
(52) U.S. Cl.
  CPC .............. *F15B 15/149* (2013.01); *F15B 7/00* (2013.01); *F15B 2015/206* (2013.01); *F16C 1/10* (2013.01)
(58) Field of Classification Search
  CPC ........ F15B 9/16; F15B 9/17; F15B 2015/206; F16C 1/10
  USPC .......................................................... 92/137
  See application file for complete search history.

(56) References Cited

U.S. PATENT DOCUMENTS

| | | | | |
|---|---|---|---|---|
| 3,285,061 | A * | 11/1966 | Hegenbart | F15B 7/00 73/862.584 |
| 4,372,118 | A * | 2/1983 | Andresen | F15B 7/00 60/533 |
| 4,488,449 | A | 12/1984 | Moore et al. | |
| 4,881,423 | A * | 11/1989 | Troiano | B60R 22/44 74/501.6 |
| 5,433,126 | A * | 7/1995 | Corbett | F16C 1/10 74/501.6 |
| 5,794,487 | A * | 8/1998 | Solomon | B25J 9/106 474/271 |
| 7,191,696 | B2 * | 3/2007 | Morr | F15B 15/06 74/108 |
| 7,487,707 | B2 | 2/2009 | Pfaff et al. | |
| 10,683,639 | B2 * | 6/2020 | Cho | E02F 9/2203 |

OTHER PUBLICATIONS

International Patent Application No. PCT/CA2019/051504, International Search Report and Written Opinion dated Jan. 20, 2020.

* cited by examiner

FLUID-CABLE TRANSMISSION FOR REMOTE ACTUATION

TECHNICAL FIELD

The present application relates generally to actuators, and in particular to actuators suitable for creating remotely actuated movement, utilizing a range of compressive and tensile forces.

BACKGROUND ART

Mechanical transmission systems that allow motions and forces to be transmitted over a distance are known. Examples include automotive transmission units that transmit engine forces to the wheels of an automobile, bicycle cables that transmit the rider's grip force to the brakes, and hydraulics that drive the links of an excavator arm.

Mechanical transmissions can also be used to drive the links of robot arms. In a hydraulic robot arm, each joint is actuated by a piston inside a hydraulic cylinder. Hydraulic fluid fills the cylinder on each side of the piston and can push it in either direction. The pressure drop across the piston and hence the piston force is regulated by electronically controlled valves at the base of the robot.

Pneumatic robots work in substantially the same way as hydraulic robot arms. However, pneumatic robots utilize air as the working fluid instead of a hydraulic fluid. These robots require non-programmable hard stops to control position, as air is too compressible to control position accurately using feedback control.

One disadvantage of conventional hydraulic robots is that the hydraulic fluid can leak and are difficult to control, and their compressors are noisy. Hence, electric robots dominate the industrial robot market.

A subject of recent robotics research is Remote Actuation Systems (RAS), which use stationary electric motors to drive robot joints remotely via hydraulic, pneumatic, or cable transmissions. In a hydraulic RAS, a stationary master cylinder/piston at the robot base drives a remote slave cylinder/piston via a pair of hydraulic lines that connect the respective sides of the master and slave cylinders. A motor drives a pushrod connected to the master cylinder. As hydraulic fluid is practically incompressible, the slave follows the master precisely. However, such systems are prone to leaks. Moreover, such systems must overcome friction at o-ring seals disposed on pistons and on cylinders where pushrods exit.

Cable drives avoid the leaks and seal friction of hydraulics and pneumatics, but are more elastic than hydraulics, resulting in the slave following the master with less accuracy under load. As cables can apply only tension, cable drives must work in antagonistic pairs, which are difficult to route through moving robot links. Consequently, cable drives have been applied primarily to parallel robots, which have actuated joints near the base of the robot.

Robotics researchers have recently investigated using rolling diaphragm seals instead of o-rings on master/slave hydraulic pistons to eliminate leaks and minimize friction. However, these seals require that hydraulic pressure be applied to only one side of the piston. These unidirectional hydraulic pistons must either work against springs, which is not efficient, or they must work in antagonistic pairs, which is less compact.

Researchers have used the latter approach to design a slave robot operated by a human master demonstrating haptic transparency or low friction of the system. However, these systems again use unidirectional cylinders.

Accordingly, improvements that mitigate at least some of the aforementioned disadvantages are desired. There is a need for improved actuator systems that permit flexible transmission of forces and motions with regard to orientations and directions, and further allow the use of lightweight materials in robotic arms.

SUMMARY OF INVENTION

In accordance with one aspect of the present invention there is provided a fluid cable transmission system that includes a first cylinder, a second cylinder and a tubing assembly interconnecting them and a cable disposed therethrough. The first cylinder includes: a first cylinder housing having a first opening; a first piston slidably mounted within the first cylinder housing; and a first seal member disposed within the first cylinder housing where the first seal member and the first piston dividing the first cylinder housing into a first chamber having the first opening and a second chamber. The second cylinder includes: a second cylinder housing comprising a second opening; a second piston slidably mounted within the second cylinder housing; and a second seal member disposed within the second cylinder housing, the second seal member and the second piston dividing the second cylinder housing into a third chamber having the second opening and a fourth chamber. The tubing assembly connects the first opening and the second opening thereby placing the first and third chambers in fluid communication; and a cable connecting the first and second pistons through the tubing assembly. The first and second seal members prevent fluid in the first and third chambers from entering the second and fourth chambers respectively.

BRIEF DESCRIPTION OF DRAWINGS

In the figures, which illustrate by way of example only, embodiments of the present invention.

DESCRIPTION OF EMBODIMENTS

Figure 1:
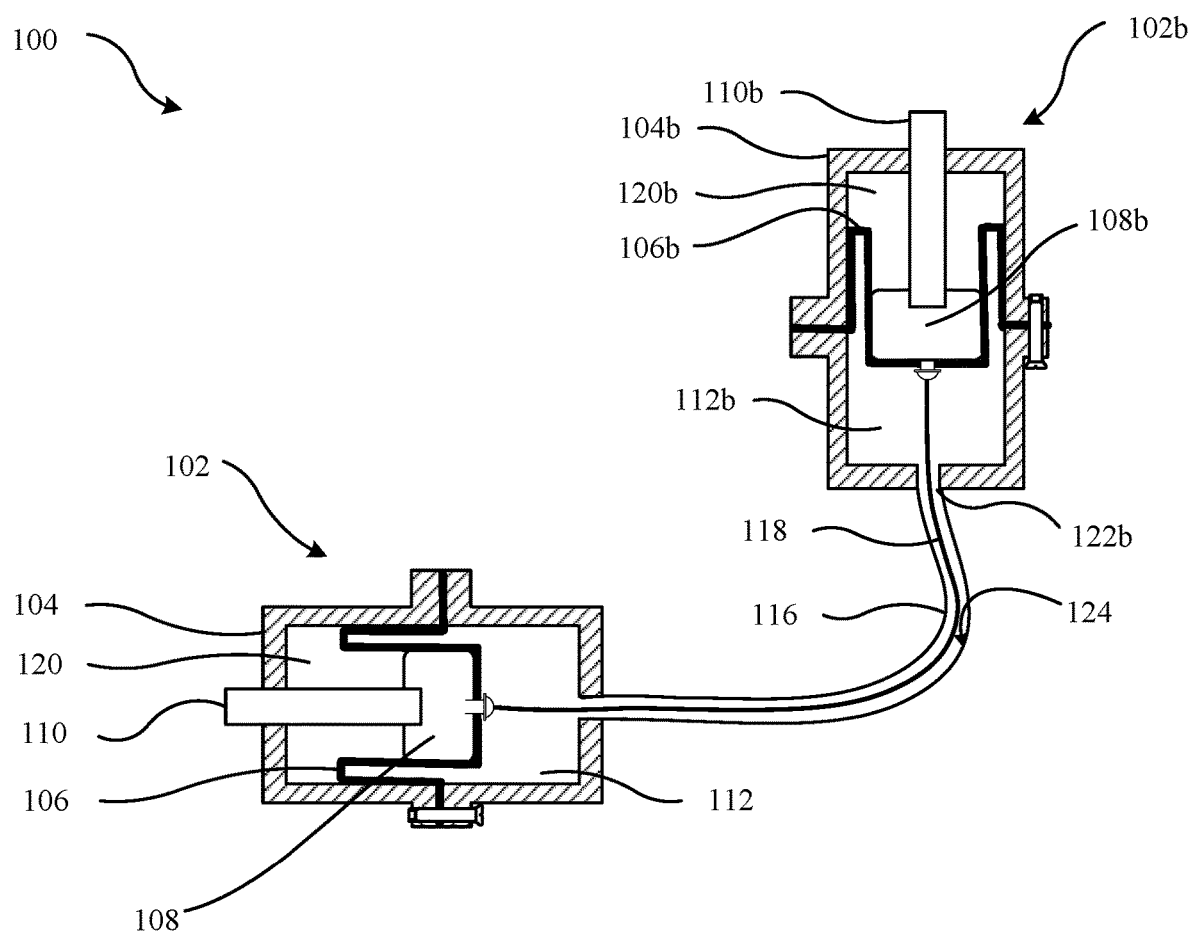
FIG. 1 is a cross-sectional diagram of a fluid-cable transmission system, exemplary of an embodiment of the present invention, having a pair of identical hydraulic cylinders connected to each other by a hydraulic hose containing hydraulic fluid and a wire cable.

A description of various embodiments of the present invention is provided below. In this disclosure, the use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like. Directional terms such as "top", "bottom", "upwards", "downwards", "vertically" and "laterally" are used for the purpose of providing relative reference only, and are not intended to suggest any limitations on how any article is to be positioned during use, or to be mounted in an assembly or relative to an environment.

The terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

In addition, the terms "first", "second", "third" and the like are used for descriptive purposes only and cannot be interpreted as indicating or implying relative importance.

In the description of the invention, it should also be noted that the terms "mounted", "linked" and "connected" should be interpreted in a broad sense unless explicitly defined and limited otherwise. For example, it could be fixed connection, or assembled connection, or integrally connected; either hard-wired or soft-wired; it may be directly connected or indirectly connected through an intermediary. For those of skill in the art, the specific meanings of the above terms in the invention may be understood in context.

In the drawings illustrating embodiments of the present invention, the same or similar reference labels correspond to the same or similar parts. In the description of the invention, it should be noted that the meaning of "a plurality of" means two or more unless otherwise specified. The directions or positions of the terms "up", "down", "left", "right", "inside", "outside", "front end", "back end", "head", "tail", the orientation or positional relationship shown in the drawings is merely for the convenience of describing the invention and simplifying the description rather than indicating or implying that the indicated device or element must have a particular orientation and be constructed and operated in a particular orientation, and therefore cannot be used as a limitation of the invention.

The present disclosure describes several embodiments of a mechanical transmission system that transmits motions and forces from one location to another while allowing the relative position and/or orientation of the locations to change continuously. An important application of these embodiments is to actuate joints and tooling such as a gripper of a robotic arm using stationary motors in the robot's base. As the motors do not contribute any weight or inertia to the arm, this arrangement yields a lightweight and agile arm that is more human safe.

Embodiment I

FIG. 1 depicts a cross-sectional diagram of a fluid-cable transmission (FCT) system 100, exemplary of an embodiment of the present invention. The fluid-cable transmission system 100 includes a first hydraulic cylinder 102 and a second hydraulic cylinder 102b that are connected to each other by a tubing assembly, which in this embodiment is a hydraulic hose 116.

The first hydraulic cylinder 102 comprises a cylinder housing 104, a piston 108 slidably mounted within the cylinder housing 104. Piston 108 has a piston rod 110. The cylinder housing 104 may be made up of multiple parts that are removably coupled by fastening means such as screws, bolts and nuts, or welded together.

A seal in the form of a rolling diaphragm 106 defines a first chamber 120 containing air and a second chamber 112 within cylinder housing 104 containing hydraulic fluid. The rolling diaphragm 106 seals hydraulic fluid in the second chamber 112 on one side of piston 108 from air on the other chamber 120. The diaphragm 106 is leak proof and produces much less friction than standard o-ring piston seals.

Cylinder housing 104 contains an opening 122 that is attached to the first end of hydraulic hose 116. Cylinder housing 104b contains an opening 122b that is attached to the second end of hydraulic hose 116.

Chamber 112 of cylinder housing 104 is in fluid communication with hydraulic hose 116, which is in turn in fluid communication with chamber 112b of cylinder housing 104b. Hydraulic hose 116 and thus also contains the hydraulic fluid.

As may be appreciated, like parts of the two cylinders are labeled with similar reference numerals but with a postfix 'b' to parts of the second cylinder, to distinguish them from their counterparts in the first cylinder.

The second hydraulic cylinder 102b similarly comprises a cylinder housing 104b, a piston 108b slidably mounted within the cylinder housing 104b. Piston 108b has a piston rod 110b. The cylinder housing 104b may be made up of multiple parts that are removably coupled by fastening means such as screws, bolts and nuts, or welded or otherwise coupled together.

A seal in the form of a rolling diaphragm 106b defines a first chamber 120b containing air, and a second chamber 112b within cylinder housing 104b containing hydraulic fluid. The rolling diaphragm 106b seals hydraulic fluid in the second chamber 112b on one side of piston 108b from air on the other chamber 120b. The diaphragm 106b is leak proof and produces much less friction than standard o-ring piston seals.

Cylinder housing 104b contains an opening 122b that is attached to the first end of hydraulic hose 116b. Cylinder housing 104b contains an opening 122b that is attached to the second end of hydraulic hose 116b.

Chamber 112b of cylinder housing 104b is in fluid communication with hydraulic hose 116b which is in turn, in fluid communication with chamber 112b of cylinder housing 104b. Hydraulic hose 116b thus also contains the hydraulic fluid.

The second hydraulic cylinder 102b similarly comprises a cylinder housing 104b, a piston 108b having a piston rod 110b slidably mounted within the cylinder housing 104b. The cylinder housing 104b may also be made up of multiple parts that are removably coupled by fastening means such as screws, bolts and nuts, or welded or otherwise securely coupled together.

Hydraulic hose 116, in the embodiment of FIG. 1, is hollow and has an inner surface 124. Hydraulic hose 116 is made up of material that permits cylinder housing 104 and cylinder housing 104b to be in fluid communication. Hydraulic hose 116 in the embodiment of FIG. 1 is flexible, although as will be discussed later, in other embodiments, the tubing assembly may include partially or entirely of rigid or semi-rigid hoses, segments and/or components.

A wire cable 118 disposed through the tubing assembly in the form of hose 116 connects piston 108 and piston 108b. In the embodiment depicted in FIG. 1 the wire cable 118 is a concentric wire cable although other types of wire cable may be used in other embodiments.

In operation, the fluid transmits pushing forces between piston 108 and piston 108b, while the wire cable 118 transmits pulling forces. The flexible hose 116 allows cylinder 108b to move in space relative to cylinder 108.

A motor or a person (not shown) can slide the rod 110 in either direction relative to its cylinder housing 104. Pushing the rod 110 into the cylinder housing 104 decreases the volume of fluid in chamber 112 and thereby increases the volume of fluid in chamber 112b of cylinder housing 104b by the same amount. This pushes piston rod 110b out of its cylinder housing 104b with a force and displacement equal to that applied to the piston rod 110.

Conversely, if the piston rod 110 is pulled outward from its cylinder housing 104, then the rod 104b is pulled into its cylinder 104b by the wire cable 118. The cable 118 is pre-tensioned to ensure that the fluid is always compressed at a pressure at least equal to air pressure. This ensures that the hydraulic pressure gradient across each piston 108, 108b never reverses direction, which would cause the diaphragm 106, 106b respectively to invert and potentially jam.

Even if o-rings are used instead of diaphragms, the cable 118 allows much higher pulling forces to be transmitted, which are otherwise limited to those produced by ambient air pressure, beyond which the fluid will cavitate.

As noted above, the diaphragms 106, 106b are leak-proof and produce much less friction than standard o-ring piston seals. Moreover, unlike conventional hydraulics, there is no hydraulic fluid in chamber 120 housing rod 110 of piston 108, and thus there is no seal required between the push rod 110 and cylinder housing 104. This helps reduce friction.

Similarly, there is no hydraulic fluid in chamber 120b housing rod 110b of piston 108b. Conveniently, there is no seal required between the push rod 110b and cylinder housing 104b either, which further reduces frictions in the system 100.

Transmission stiffness, which dictates the accuracy with which cylinder 102b follows cylinder 102, equals the stiffness of the fluid plus that of the wire cable, whether the rod 110 is being pushed or pulled. This is achieved by pre-tensioning the wire cable 118 to keep the fluid always in compression. If the fluid is liquid (hydraulic), then the (nearly incompressible) fluid determines the stiffness during both pushing and pulling, and the volume of fluid between the piston 108 and piston 108b remains nearly constant. If the fluid is air, then the wire cable 118 determines the transmission stiffness during both pushing and pulling, and this stiffness can greatly exceed that of a purely pneumatic transmission.

Flexible hydraulic hose 116 between the cylinder 102 and cylinder 102b allows the cylinder 102b to move in space relative to the cylinder 102. Hence, the FCT system 100 can be used to actuate joints that move around in space, such as those on a robot arm. The fluid also serves to lubricate the wire cable 118, which may slide against the inner surface 124 of the hose 116 wherever bends occur.

The hose 116 also bears axial compressive forces caused by tension in the cable 118 and thus plays the same role as the cable housing of a standard "Bowden cable" used on bicycles to operate brakes and gear derailleurs.

Embodiment II

Figure 2:
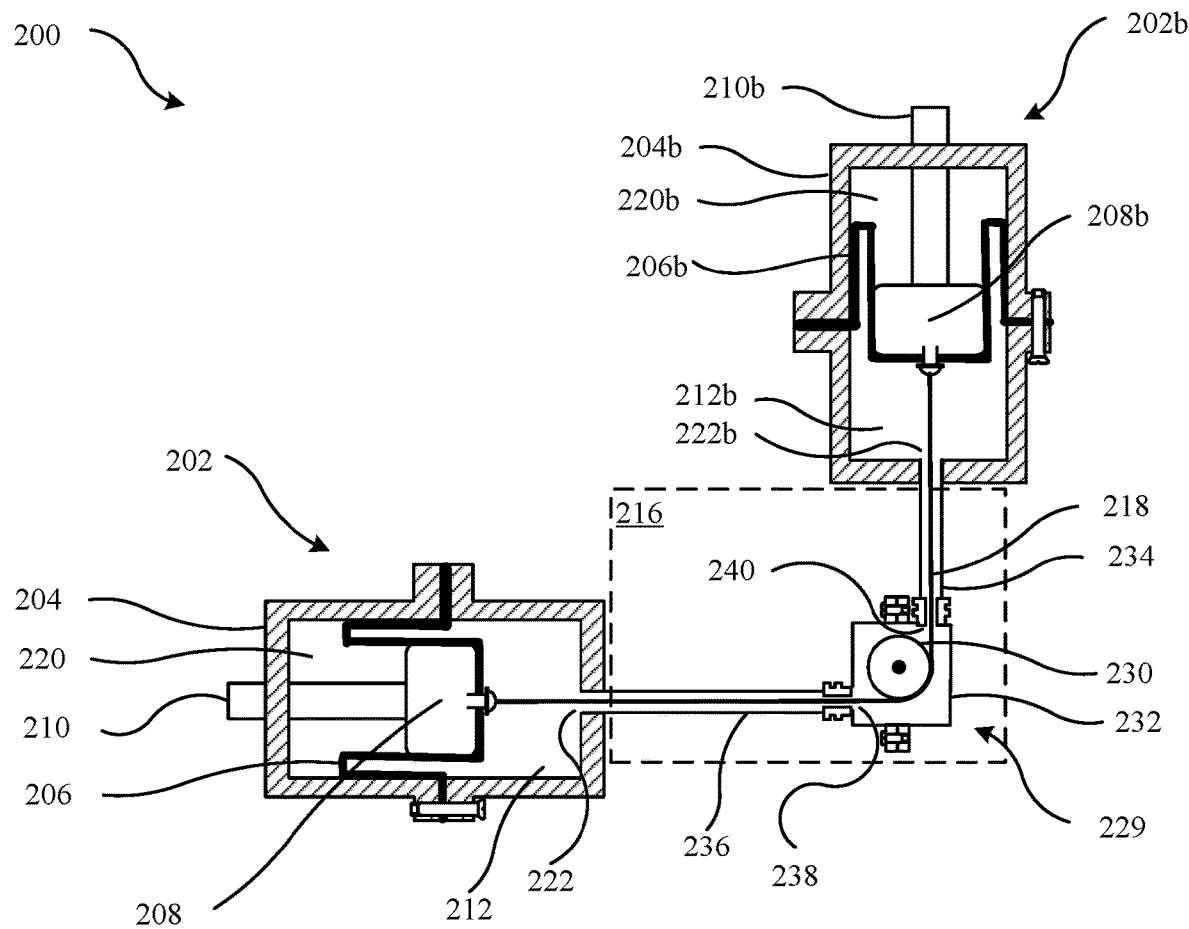
FIG. 2 is a cross-sectional diagram of a fluid-cable transmission system, exemplary of another embodiment, having a pair of hydraulic cylinders connected to each other by hydraulic hoses through fluid-cable pulley assembly and a wire cable engaging the pulley.

FIG. 2 depicts a cross-sectional diagram of another fluid-cable transmission (FCT) system 200, exemplary of another embodiment of the present invention. The fluid-cable transmission system 200 includes a first hydraulic cylinder 202 and a second hydraulic cylinder 202b that are connected to each other by a tubing assembly 216.

A rolling diaphragm 206 defines a first chamber 220 containing air and a second chamber 212 containing hydraulic fluid, within cylinder housing 204. The rolling diaphragm 206 seals hydraulic fluid in the second chamber 212 on one side of piston 208 from air on the other chamber 220. The diaphragm 206 is leak proof and produces much less friction than standard o-ring piston seals. Cylinder housing 204 contains an opening 222.

Again, like parts of the two cylinders 202, 202b are labeled with similar reference numerals, but with a postfix 'b' to parts of the second cylinder, to distinguish them from those in the first.

The second hydraulic cylinder 202b similarly includes a cylinder housing 204b, a piston 208b slidably mounted within the cylinder housing 204b. Piston 208b has a piston rod 210b. The cylinder housing 204b may be made up of multiple parts that are removably coupled by fastening means such as screws, bolts and nuts, or welded together.

A rolling diaphragm 206b defines a first chamber 220b containing air, and a second chamber 212b within cylinder housing 204b containing hydraulic fluid. The rolling diaphragm 206b seals hydraulic fluid in the second chamber 212b on one side of piston 208b from air on the other chamber 220b. The diaphragm 206b is leak proof and produces much less friction than standard o-ring piston seals. Cylinder housing 204b contains an opening 222b.

Chamber 212 of cylinder housing 204 is in fluid communication with tubing assembly 216, which is in turn, in fluid communication with chamber 212b of cylinder housing 204b. Tubing assembly 216 thus also contains the hydraulic fluid.

Figure 3:
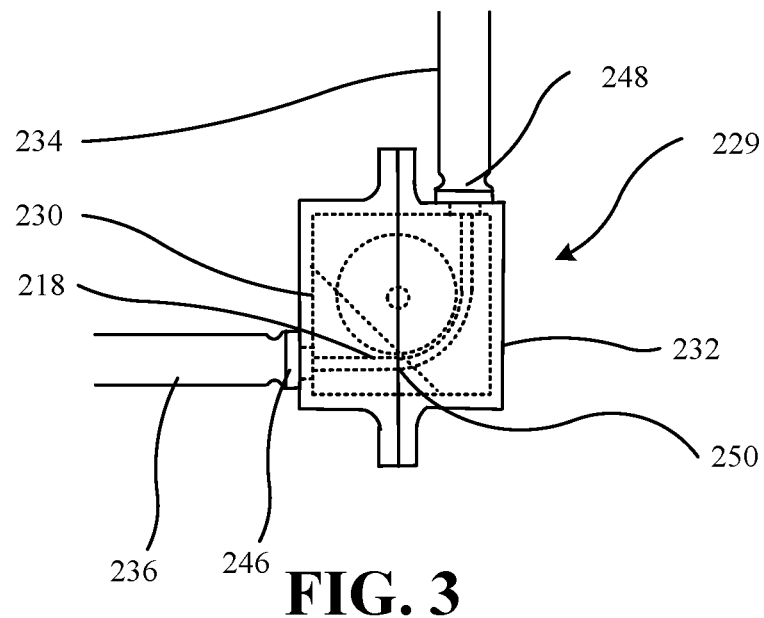
FIG. 3 is a simplified schematic diagram of a portion of the fluid-cable transmission system of FIG. 2 depicting the pulley assembly forming part of the system.
Figure 4:
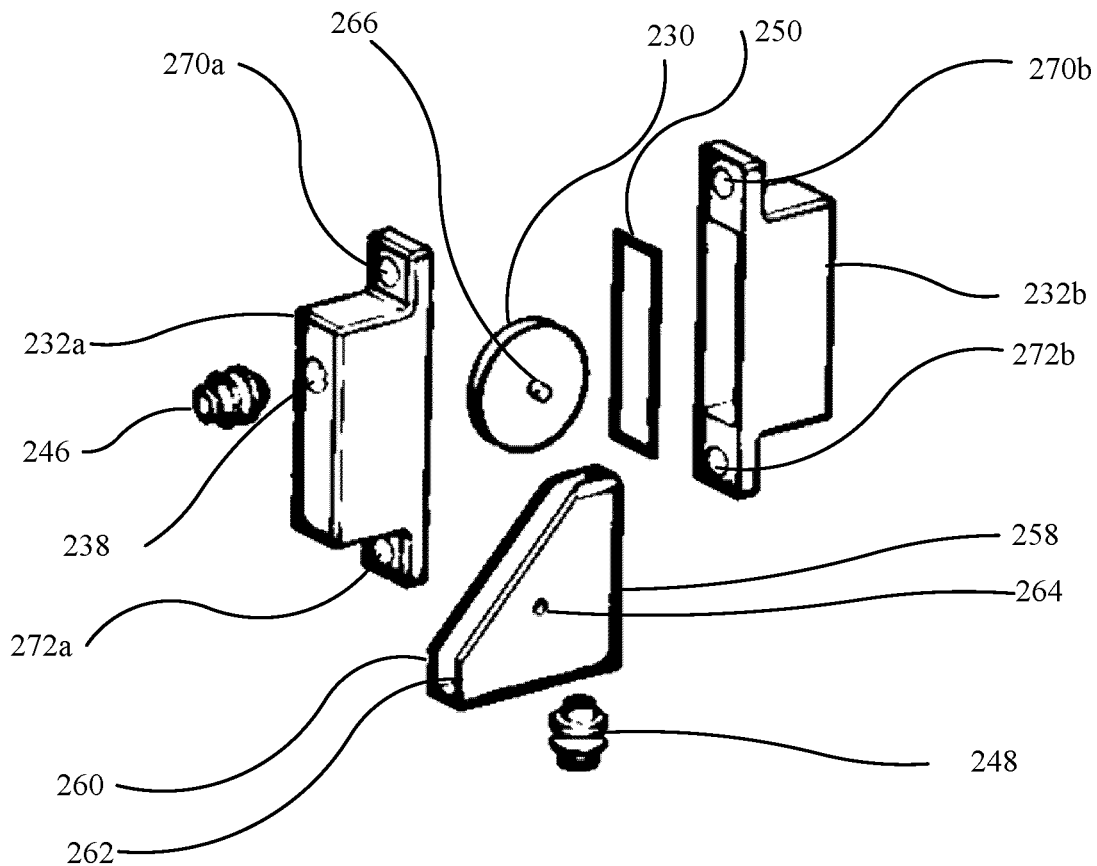
FIG. 4 is an exploded perspective view of components that make up the pulley assembly of FIG. 3.

Tubing assembly 216, in the embodiment of FIG. 2, comprises a pulley assembly 229 a first hydraulic hose 236 and a second hydraulic hose 234. Pulley assembly 229 comprises a pulley housing 232, a pulley wheel 230 contained within said housing 232 and related components as illustrated in FIG. 3 and FIG. 4.

Pulley housing 232 has a first orifice 238 and a second orifice 240. The first orifice 238 is connected to one end of the hose 236. The other end of the hose 236 is connected to opening 222. The second orifice 240 is connected to one end of the hose 234. The other end of the hose 234 is connected to opening 222b.

Components of tubing assembly 216 are interconnected in a leak proof fashion, so that chamber 212 of cylinder housing 204 and chamber 212b of cylinder housing 204b are in fluid communication with one another.

Hydraulic hoses 236, 234 in the embodiment of FIG. 2 may be rigid, or semi-rigid although as will be discussed later, in other embodiments, the tubing assembly may be made up of flexible, partially flexible, rigid or semi-rigid segments and components.

A wire cable 218 disposed through the tubing assembly 216 connects piston 208 and piston 208b. Wire cable 218 may be a concentric wire cable although other types of wire cable may be used in other embodiments. As shown, in the embodiment of FIG. 2, wire cable 218 is disposed within hose 236, at least partly wound over the pulley wheel 230 and disposed within pulley housing 232, and within hose 234.

FIG. 3 depicts an enlarged view of one embodiment of the pulley assembly 229 which forms part of the fluid-cable transmission system 200 of FIG. 2. As noted above, pulley assembly 229 includes the pulley housing 232, containing the pulley wheel 230 therein.

A connector 246 connects one end of the hose 236 to orifice 238 of housing 232 in a fluid tight manner. Another connector 248 connects one end of the hose 234 to another orifice of housing 232 also in a fluid tight manner. As will be illustrated in FIG. 4 later, housing 232 is made up of two pulley-housing halves 232a, 232b that are coupled together using a seal such as gasket 250 to form a fluid tight seal along their enclosure openings.

FIG. 4 depicts an exploded view of the components that make up pulley assembly 229 of in FIG. 3. As shown, the components include the pair of pulley housing halves 232a, 232b that make up the pulley housing 232, when fastened together by simple fastening or coupling means such as bolts and nuts, screws or other simple fastening or coupling means (not shown) through corresponding holes 270a, 270b and corresponding holes 272a, 272b to secure the pulley housing halves 232a, 232b together in position. Many alternative fastening means will be readily apparent to persons of skill in the art.

Gasket 250 is rectangular in shape and dimensioned to correspond to the perimeter of the enclosure openings of each pulley housing half 232a, 232b. Gasket 250 is disposed around the perimeter of the enclosure openings each pulley housing half 232a, 232b to form a tight seal when they two halves are secured together. Gasket 250 may be made up flexible material.

A wheel bracket 258 includes a pair of substantially parallel sidewalls 260, 262 spaced apart to allow pulley wheel 230 to be received therein. The sidewalls 260, 262 are further dimensioned to be secured within housing 232.

In the illustrated embodiment, pulley wheel 232 includes a protrusion 266 on each side of its circular side walls, which will be rotatably mounted within openings 264 in the bracket 258.

Connectors 246, 248 are used to join hoses 234, 236 to the orifices 222, 222b so as to cause chamber 212 and chamber 212b to remain in fluid communication with one another.

Embodiment III

Figure 5:
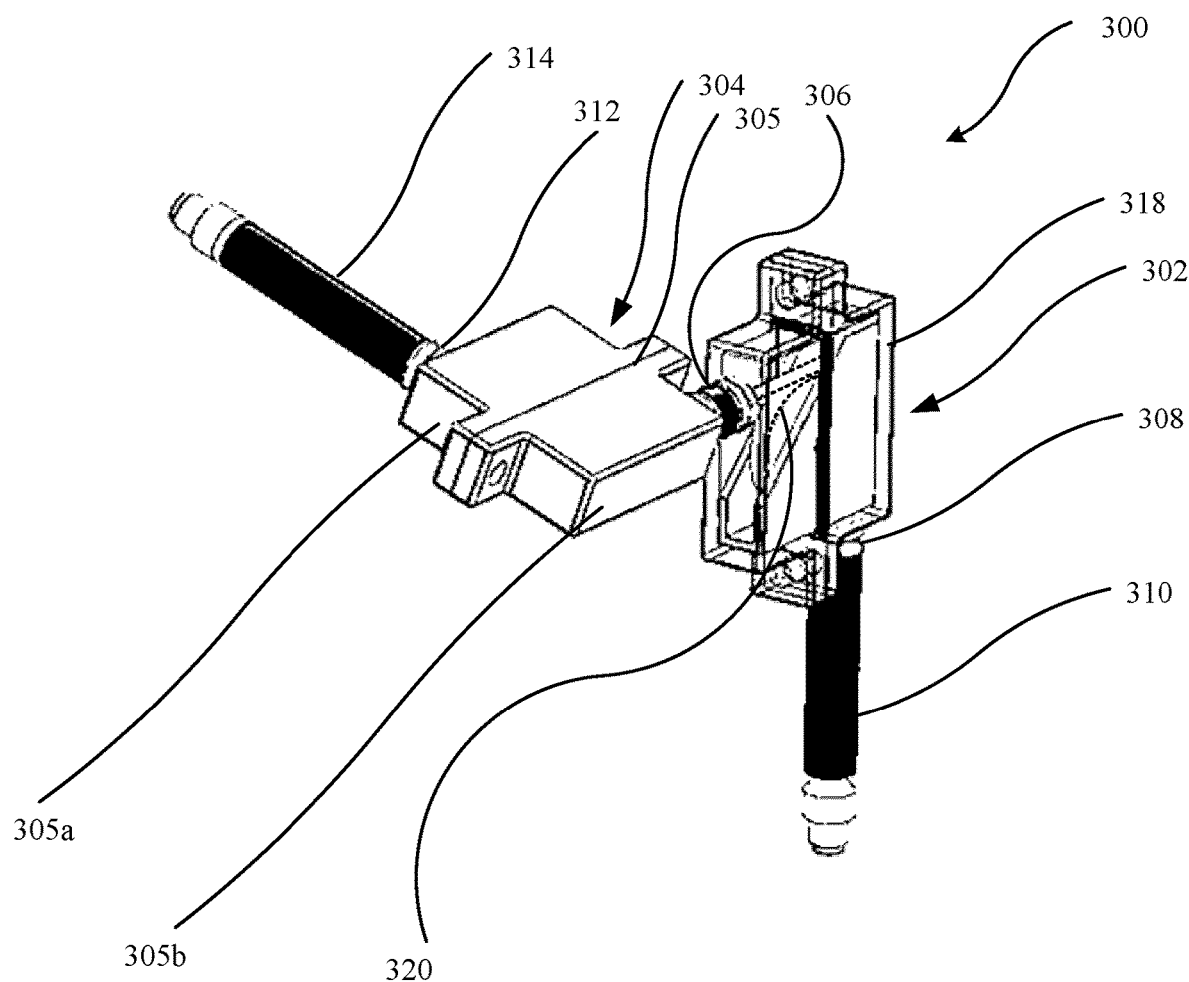
FIG. 5 is a simplified diagram of two fluid-cable pulley assemblies connected together by a straight hydraulic swivel joint, which allows relative rotation between the two hose segments about an axis perpendicular to both segments.

FIG. 5 depicts a perspective view another embodiment of a tubing assembly 300, which may be used instead of tubing assembly 216 in the embodiment of FIG. 2. As depicted, tubing assembly 300 includes a first pulley assembly 302 and a second pulley assembly 304 that are connected together by a swivel joint 306.

Each one of first pulley assembly 302 and second pulley assembly 304 is very similar to pulley assembly 229 and therefore the components will not be described further. However, the interconnections between the pulley assembly 302 and pulley assembly 304 are different compared to the interconnections of pulley assembly 229.

Specifically, a hose 314 interconnects to the orifice of a pulley housing half 305a of a pulley housing 305 of the pulley assembly 304 via a connector 312. An orifice formed on the other pulley housing half 305b of the pulley housing 305 connects to a first orifice of a pulley housing 318 of pulley assembly 302 via the swivel joint 306. A second orifice of pulley housing 318 of pulley assembly 302 interconnects to a second hose 310 via another connector 308.

A wire cable (not shown in FIG. 5) such as wire cable 218 will be disposed in a first hydraulic cylinder (not shown) and within hose 314 which is in fluid communication with the first cylinder. The wire cable will be further disposed within pulley housing 305, wound at least partially around a pulley wheel therein (not shown), within housing 318 wound at least partially around another pulley wheel 320 contained therein, and then through hose 310 to a second hydraulic cylinder.

Advantageously, tubing assembly 300 allows the use of rigid materials for hoses 314, 310. This improves the spatial mobility of the second pulley and helps eliminate friction between the cable and the hoses 314, 310.

A straight hydraulic swivel joint such as swivel joint 306, allows relative rotation between the two hose segments such as hoses 310, 314 about an axis perpendicular to both hoses 310, 314.

Connecting several such hose segments in series by extending the arrangement shown in FIG. 5 using a plurality of pulley assemblies to swivel joints allows full spatial motion of the follower or slave cylinder relative to the initiating or controlling or master cylinder without bending or twisting the hose segments forming part of the tubing assembly.

As a further advantage, it is to be noticed that using straight hose segments such as hose 314 and hose 310 prevents the wire cable from rubbing against the inner wall of the respective hose. It also allows the hose to be made from or supported by rigid materials, which can bear the compressive loads caused by cable tension.

Embodiments of the present invention such as that shown in FIG. 5, can be used to actuate a joint of a robot arm. The hoses and pulley assemblies can be attached to the robot links extending from the base of the robotic arm to the actuated joint.

Methods of Use

An exemplary fluid-cable transmission (FCT) system such as system 200, can be used to actuate the joints and tooling such as a gripper of a robotic arm using stationary motors in the robot's base. As the motors do not add any weight or inertia to the arm, it becomes possible to use a lightweight and agile arm that is safer for humans.

Other embodiments can be used in a hand controller or master robot to reflect haptic forces from a slave arm and its hand/gripper to a human operator. The low friction design provides a high level of haptic transparency. Teleoperation at large distances may be possible if electric motors are used to drive the master pistons in the master and slave robots.

Embodiments of the system can be used for intrinsically-safe applications where electric motors are not permitted due to risk of a spark which may lead to an explosion.

Advantageously, embodiments of the present invention are also suitable for construction out of non-metallic parts and materials, which can be used in strong magnetic fields such as inside an MRI machine.

In some alternate embodiments of the present invention, the fluid-cable transmission system may be a pneumatic system and the fluid may be gas. The tubing assembly associated with such a pneumatic system may generally be much less stiff, but pretension in the cable can increase the effective stiffness in the system. In such embodiments, seals, connectors, and fastenings will need to be leak-proof against gas so as to prevent any leakage of the gas in the system.

In some embodiments, the bore of a master cylinder such as cylinder 102 and the bore of slave cylinder (e.g., cylinder 102b) are matched so that displacements are matched and the cable length and tension is consistent;

In an alternative embodiment, the slave cylinder (e.g., cylinder 102b) may have a slightly smaller bore, which will induce stretch in the internal cable (e.g., wire cable 118) so as to increase the cable tension. This can also be used to introduce an elastic bias where the unloaded system returns to an initial position, which minimizes the cable stretch. In another alternative embodiment, additional human-safe operation may be provided by incorporating a weak link in the cable or a weak link in the fluid—such as a bursting diaphragm, or both. In yet another alternative embodiment, the fluid-cable device itself may form a structural member with stiffness which can be modulated by adjusting the fluid pressure or the cable tension or both. Applications for such a modulated structural member include truss robots, parallel-link robots, serial link robots, and shock absorbers.

Conveniently, embodiments present invention such as the embodiment of system 100 described in FIG. 1 have hose routing advantages allowing, for example, the use of a single hose 116, which avoids paired antagonist hydraulic hoses.

As may be understood by persons of skill in the art, at least some of components of the system or tubing assembly discussed above with reference to FIGS. 1-5, may be provided as a kit for later assembly and construction. The kit may include components of the embodiments disclosed, as well as sub-assemblies of components, adapted to be combined to form the systems and tubing assemblies as disclosed herein.

Having thus described, by way of example only, embodiments of the present invention, it is to be understood that the invention as defined by the appended claims is not to be limited by particular details set forth in the above description of exemplary embodiments as many variations and permutations are possible without departing from the scope of the claims.

What is claimed is:

1. A fluid cable transmission system comprising:
   a first cylinder comprising:
      a first cylinder housing comprising a first opening;
      a first piston slidably mounted within the first cylinder housing; and
      a first seal member disposed within the first cylinder housing, the first seal member and the first piston dividing the first cylinder housing into a first chamber having the first opening and a second chamber;
   a second cylinder comprising:
      a second cylinder housing comprising a second opening;
      a second piston slidably mounted within the second cylinder housing; and
      a second seal member disposed within the second cylinder housing, the second seal member and the second piston dividing the second cylinder housing into a third chamber having the second opening and a fourth chamber;
   a tubing assembly connecting the first opening and the second opening thereby placing the first and third chambers in fluid communication; and
   a cable connecting the first and second pistons through the tubing assembly;
   wherein the first and second seal members prevent fluid in the first and third chambers from entering the second and fourth chambers respectively.

2. The system of claim 1, wherein at least one of the first seal and the second seal is a diaphragm.

3. The system of claim 1, wherein the tubing assembly comprises a hose.

4. The system of claim 3, wherein the hose is flexible.

5. The system of claim 1, wherein the cable is pretensed.

6. The system of claim 1, wherein the tubing assembly comprises:
   a) a first hose in fluid communication with the first orifice and the first opening; and b) a second hose in fluid communication with the second orifice and the second opening;
   wherein the cable is disposed: within the first hose, at least partly wound over the pulley wheel within the pulley housing, and further disposed within the second hose.

7. The system of claim 6, wherein at least one of the first hose and the second hose is rigid.

8. The system of claim 6, wherein the first pulley housing and the second pulley housing each comprise a first half and a second half that are joined together with a gasket disposed therebetween, in a fluid tight manner.

9. The system of claim 6, wherein at least one of the first pulley assembly and the second pulley assembly comprises a plurality of parts removably coupled by fastening means.

10. The system of claim 1, wherein the first piston comprises a first piston rod and the second piston comprises a second piston rod.

11. The system of claim 1, further comprising:
   a) a first hose connecting the first orifice and the first opening; and
   b) a second hose connecting the fourth orifice and the second opening;
   wherein the cable is further disposed within the first hose and within the second hose.

12. The system of claim 1, wherein the swivel joint permits relative rotation between the first hose and the second hose.

13. The system of claim 12, wherein the relative rotation between the first hose and the second hose is about an axis perpendicular to both the first hose and the second hose.

14. The system of claim 1, wherein each of the first pulley assembly and the second pulley assembly comprises a plurality of parts removably coupled by fastening means.

15. The system of claim 11, wherein one of the first hose is rigid and the second hose is rigid.

16. A robotic arm comprising the system of claim 1.

17. The system of claim 1, wherein the fluid is hydraulic fluid.

18. The system of claim 1, wherein the cable is wire cable.

* * * * *